United States Patent
Tran (10) Patent No.: US 10,734,709 B2
(45) Date of Patent: Aug. 4, 2020

(54) COMMON-RADIATOR MULTI-BAND ANTENNA SYSTEM

(71) Applicant: QUALCOMM Incorporated, San Diego, CA (US)

(72) Inventor: Allen Minh-Triet Tran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/145,880

(22) Filed: Sep. 28, 2018

(65) Prior Publication Data

US 2020/0106157 A1    Apr. 2, 2020

(51) Int. Cl.
| | |
|---|---|
| *H04M 1/00* | (2006.01) |
| *H01Q 1/24* | (2006.01) |
| *H01Q 1/22* | (2006.01) |
| *G06F 1/16* | (2006.01) |
| *H04M 1/725* | (2006.01) |
| *H04W 88/02* | (2009.01) |

(52) U.S. Cl.
CPC ........... *H01Q 1/243* (2013.01); *G06F 1/1698* (2013.01); *H01Q 1/2291* (2013.01); *H04M 1/72519* (2013.01); *H04M 1/72522* (2013.01); *H04W 88/02* (2013.01)

(58) Field of Classification Search
CPC .... H01Q 1/243; H01Q 1/2291; G06F 1/1698; H04M 1/72519; H01M 1/72522; H04W 88/02
USPC ..................................... 455/575.7, 82, 550.1
See application file for complete search history.

(56) References Cited

U.S. PATENT DOCUMENTS

| | | | |
|---|---|---|---|
| 4,775,866 A | 10/1988 | Shibata et al. | |
| 7,852,281 B2 | 12/2010 | Choudhury | |
| 9,531,087 B2 | 12/2016 | Ying et al. | |
| 10,305,172 B2* | 5/2019 | Noori .................. | H01Q 1/2258 |
| 2006/0178116 A1* | 8/2006 | Qi ........................ | H04B 1/3833 |
| | | | 455/90.3 |
| 2010/0225551 A1* | 9/2010 | Yang ..................... | H01Q 9/42 |
| | | | 343/749 |
| 2012/0119966 A1* | 5/2012 | Guan ..................... | H01Q 9/26 |
| | | | 343/793 |
| 2012/0235881 A1 | 9/2012 | Pan et al. | |
| 2013/0272217 A1* | 10/2013 | Negus ..................... | H04J 1/00 |
| | | | 370/329 |
| 2013/0345695 A1* | 12/2013 | McPherson ............ | H02J 50/40 |
| | | | 606/34 |

(Continued)

OTHER PUBLICATIONS

International Search Report and Written Opinion—PCT/US2019/052634—ISA/EPO—dated Jan. 3, 2020.

*Primary Examiner* — Danh C Le
(74) *Attorney, Agent, or Firm* — Hunter Clark PLLC (57) ABSTRACT

An example of a wireless communication antenna system includes: a sub-6 antenna including a radiator configured to radiate or receive first energy having a first frequency, the first frequency being below 6 GHz, the radiator being electrically conductive; a first feed configured and disposed to electrically couple the first energy to or from the radiator; and a second feed configured and disposed to electrically couple second energy to or from the radiator, the second energy having a second frequency, the second frequency being above 23 GHz; where the radiator is configured to radiate or receive the second energy.

25 Claims, 8 Drawing Sheets

(56) References Cited

U.S. PATENT DOCUMENTS

| | | | |
|---|---|---|---|
| 2015/0091585 A1* | 4/2015 | Klein | G01N 22/04 |
| | | | 324/639 |
| 2015/0147984 A1 | 5/2015 | Ying et al. | |
| 2015/0172963 A1* | 6/2015 | Kim | H04W 36/0027 |
| | | | 370/332 |
| 2016/0028157 A1* | 1/2016 | Kim | H01Q 5/335 |
| | | | 343/852 |
| 2016/0043812 A1* | 2/2016 | Bolin | H04B 13/005 |
| | | | 455/550.1 |
| 2016/0118713 A1 | 4/2016 | Hong et al. | |
| 2016/0190689 A1* | 6/2016 | Chi | H01Q 1/243 |
| | | | 343/700 MS |
| 2016/0285160 A1* | 9/2016 | Tatomirescu | H04B 1/40 |
| 2016/0330506 A1* | 11/2016 | Liao | H04N 21/4263 |
| 2017/0062937 A1 | 3/2017 | Ganchrow et al. | |
| 2017/0093049 A1 | 3/2017 | Lahti et al. | |
| 2017/0214120 A1 | 7/2017 | Lee et al. | |
| 2017/0244151 A1* | 8/2017 | Han | H01Q 1/243 |
| 2017/0288631 A1* | 10/2017 | Uehara | H03H 7/0161 |
| 2018/0091234 A1* | 3/2018 | Zhou | G06K 9/4652 |
| 2018/0231476 A1* | 8/2018 | Klein | G01N 22/04 |
| 2018/0261911 A1* | 9/2018 | Zhu | H01Q 1/243 |
| 2018/0301798 A1* | 10/2018 | Ikeda | H01Q 13/08 |
| 2018/0341000 A1* | 11/2018 | Cohen | G01S 7/003 |
| 2018/0351662 A1* | 12/2018 | Pan | H04B 17/15 |
| 2019/0069230 A1* | 2/2019 | Nishida | H04W 48/18 |

\* cited by examiner

COMMON-RADIATOR MULTI-BAND ANTENNA SYSTEM

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support communication over a range of frequencies.

It is often desirable to have multiple communication technologies, e.g., to enable multiple communication protocols concurrently, and/or to provide different communication capabilities. For example, as wireless communication technology evolves from 4G to 5G or to different WLAN standards, for example, mobile communication devices may be configured to communicate using different frequencies, including frequencies below 6 GHz often used for 4G and certain WLAN communications, and millimeter-wave frequencies, e.g., above 23 GHz, for 5G and other WLAN communications. Communicating using different frequencies, however, may be difficult, especially using mobile wireless communication devices with small form factors.

SUMMARY

An example of a wireless communication antenna system includes: a sub-6 antenna including a radiator configured to radiate or receive first energy having a first frequency, the first frequency being below 6 GHz, the radiator being electrically conductive; a first feed configured and disposed to electrically couple the first energy to or from the radiator; and a second feed configured and disposed to electrically couple second energy to or from the radiator, the second energy having a second frequency, the second frequency being above 23 GHz; where the radiator is configured to radiate or receive the second energy.

Implementations of such a system may include one or more of the following features. The second feed is configured to couple a respective portion of the second energy to each of a plurality of locations of the radiator. The radiator defines a plurality of slots, with each of the plurality of slots being disposed at a respective one of the plurality of locations. The second feed includes a plurality of microstrip lines, with each of the plurality of microstrip lines overlying a respective one of the plurality of slots. The second feed is physically or parasitically coupled to the radiator at each of the plurality of locations. The radiator includes an elongated strip of conductive material having a width at each of the plurality of locations of a multiple of about a half of a wavelength at the second frequency. The first feed is configured and disposed to couple the first energy to the radiator at a first location, the plurality of locations is a plurality of second locations, and each of the plurality of second locations is displaced from the first location by a respective odd multiple of about a quarter of a wavelength at the second frequency.

Also or alternatively, implementations of such a system may include one or more of the following features. The radiator includes a portion of a housing of a mobile wireless communication device. The radiator is configured to radiate the first energy along a length of the radiator and to radiate the second energy along a width of the radiator. The radiator has a length of a multiple of about a half of a wavelength at the first frequency and the width of the radiator is a multiple of about a half of a wavelength at the second frequency. The second feed is configured and disposed to electrically couple the second energy to or from the radiator at a plurality of locations displaced from each other along the length of the radiator. The width of the radiator at each of the plurality of locations is a multiple of about a half of the wavelength at the second frequency. The first feed is configured and disposed to couple the first energy to or from the radiator at a first location, the plurality of locations is a plurality of second locations, and each of the plurality of second locations is displaced from the first location by a respective odd multiple of about a quarter of the wavelength at the second frequency.

Also or alternatively, implementations of such a system may include one or more of the following features. The antenna system may further include: a first source configured to provide the first energy, the first feed being coupled to the first source and to the radiator; and a second source coupled to the second feed and configured to provide the second energy to the second feed. The radiator is a monopole radiator at the first frequency. The radiator is a dipole radiator at the first frequency. The radiator is a loop radiator.

Also or alternatively, implementations of such a system may include one or more of the following features. The radiator is a monopole radiator defining a plurality of slots to radiate the second energy, and the second feed is configured and disposed to electrically couple the second energy to the radiator at a plurality of locations corresponding to the plurality of slots such that the second energy will be coupled to the radiator and radiate from the radiator at the plurality of slots. Each of the plurality of slots has a length substantially parallel to a length of the radiator. The second feed includes a plurality of microstrip lines, with each of the plurality of microstrip lines overlying a respective one of the plurality of slots. Each of the plurality of slots has a length substantially transverse to a length of the radiator. The first feed is configured and disposed to couple the first energy to the radiator at a first location, the plurality of locations is a plurality of second locations, and each of the plurality of second locations is displaced from the first location by a respective odd multiple of about a quarter of a wavelength at the second frequency.

An example of a radio-frequency energy transfer method includes: coupling first energy to or from a radiator, the first energy having a first frequency, the first frequency being below 6 GHz; coupling second energy to or from the radiator, the second energy having a second frequency, the second frequency being above 23 GHz; and radiating the first energy and the second energy from the radiator, or processing the first energy and the second energy from the radiator in one or more receive circuits.

Implementations of such a method may include one or more of the following features. Coupling the first energy to or from the radiator includes coupling the first energy to or from the radiator along a length of the radiator, and coupling the second energy to or from the radiator includes coupling the second energy to or from a plurality of slots each defined by the radiator at a respective one of a plurality of locations along the radiator. Coupling the first energy to or from the radiator includes coupling the first energy to or from the radiator along a length of the radiator, and coupling the second energy to or from the radiator includes coupling the second energy to or from the radiator over a width of the radiator at each of a plurality of locations along the radiator. Coupling the first energy includes coupling the first energy at a first location along the length of the radiator, and coupling the second energy to or from the radiator includes coupling respective portions of the second energy at respective odd multiples of a quarter of a wavelength at the second frequency from the first location.

DETAILED DESCRIPTION

Techniques are discussed herein for communicating in multiple frequency bands using collocated antennas in a wireless communication device. For example, a common conductive element may be used to radiate energy in two different frequency bands. For example, a conductive radiator may be configured to radiate energy in a lower frequency band, e.g., a sub-6 GHz band, and to provide an array of slots configured to radiate energy in a higher frequency band, e.g., above 23 GHz. The array may be fed with millimeter-wave energy for radiation by the array. As another example, a conductive radiator may be configured to be resonant along a length of the radiator to radiate energy in a lower frequency band, e.g., a sub-6 GHz band, and to be resonant across a width of the radiator to radiate energy in a higher frequency band, e.g., above 23 GHz. The radiator may have a width at each location that is fed with the higher frequency energy that is resonant at the higher frequency (e.g., is a multiple of a half of a wavelength at the higher frequency). The common conductive element may be a monopole for radiating energy of the lower frequency. Other configurations, however, may be used.

Items and/or techniques described herein may provide one or more of the following capabilities, as well as other capabilities not mentioned. Communication using different frequency bands of a wireless communication device may be provided with good isolation between signals of the different frequency bands and with good antenna performance from collocated antennas. A conductive device may serve a dual purpose as a radiator for multiple frequency bands, e.g., a sub-6 GHz frequency band and a millimeter-wave frequency band. Communication bandwidth may be increased relative to single-band communications. Carrier aggregation ability may be enhanced, and as a result, system throughput increased. A multi-band antenna system may be provided with a small form factor, e.g., a 4G/5G antenna system, or an antenna system configured for use with sub-6 GHz WLAN standards and millimeter-wave WLAN standards, may occupy the same form factor as a 4G or WLAN sub-6 GHz only antenna system. Structural integrity of mobile communication devices may be maintained or improved. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
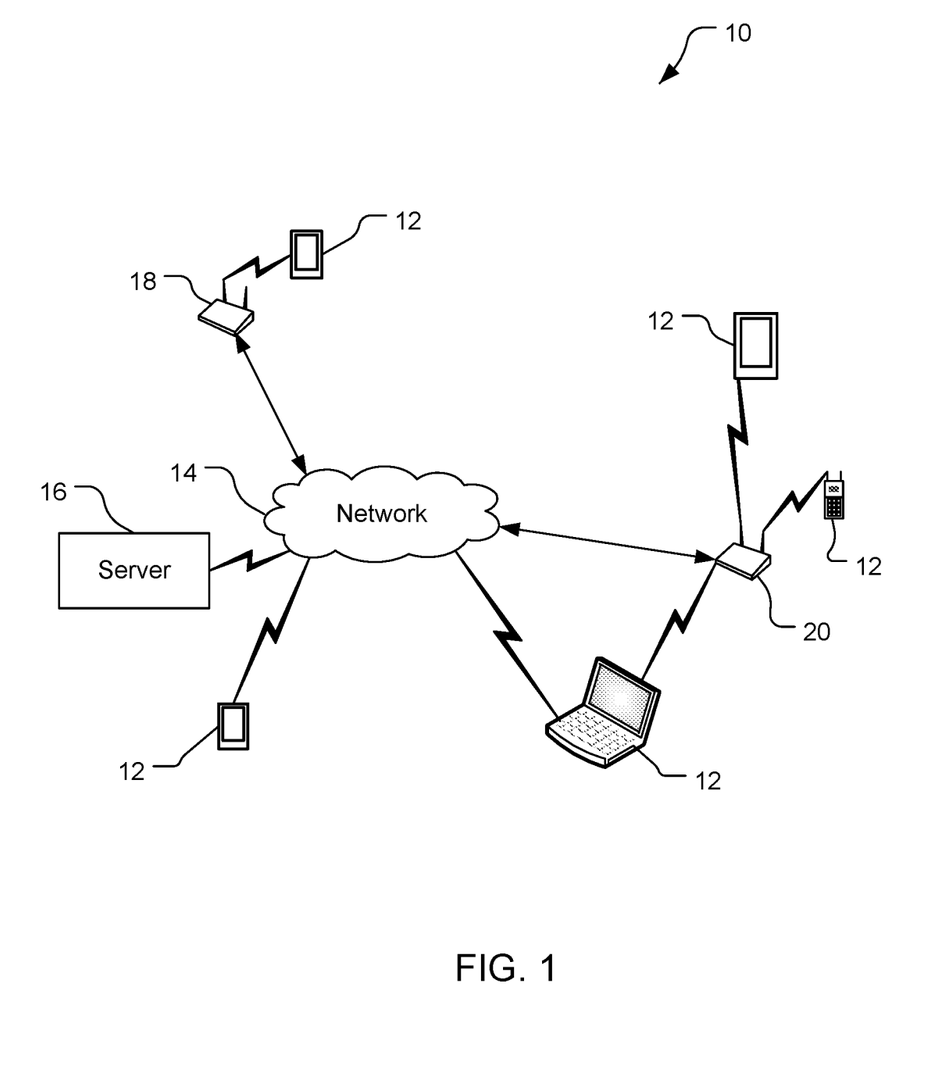
FIG. 1 is a schematic diagram of a communication system.

Referring to FIG. 1, a communication system 10 includes mobile devices 12, a network 14, a server 16, and access points (APs) 18, 20. The system 10 is a wireless communication system in that components of the system 10 can communicate with one another (at least some times using wireless connections) directly or indirectly, e.g., via the network 14 and/or one or more of the access points 18, 20 (and/or one or more other devices not shown, such as one or more base transceiver stations). For indirect communications, the communications may be altered during transmission from one entity to another, e.g., to alter header information of data packets, to change format, etc. The mobile devices 12 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the system 10 and may communicate with each other and/or with the mobile devices 12, network 14, server 16, and/or APs 18, 20. For example, such other devices may include internet of thing (IoT) devices, medical devices, home entertainment and/or automation devices, etc. The mobile devices 12 or other devices may be configured to communicate in different networks and/or for different purposes (e.g., 5G, Wi-Fi communication, multiple frequencies of Wi-Fi communication, satellite positioning, one or more types of cellular communications (e.g., GSM (Global System for Mobiles), CDMA (Code Division Multiple Access), LTE (Long-Term Evolution), etc.).

Figure 2:
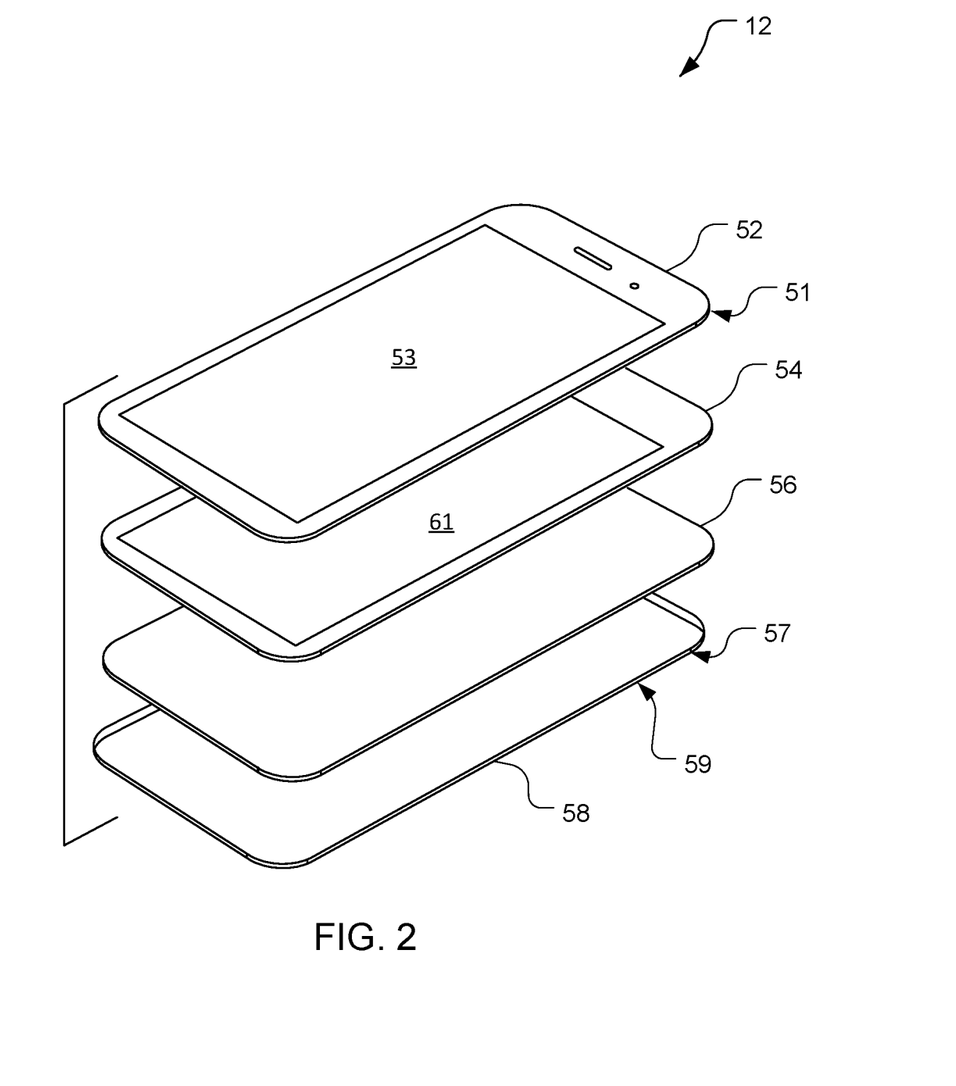
FIG. 2 is an exploded perspective view of simplified components of a mobile device shown in FIG. 1.

Referring to FIG. 2, an example of one of the mobile devices 12 shown in FIG. 1 includes a top cover 52, a display layer 54, a printed circuit board (PCB) layer 56, and a bottom cover 58. The mobile device 12 as shown may be a smartphone or a tablet computer but the discussion is not limited to such devices. The top cover 52 includes a screen 53. The bottom cover 58 has a bottom surface 59 and sides 51, 57 of the top cover 52 and the bottom cover 58 provide an edge surface. The top cover 52 and the bottom cover 58 may comprise a housing that retains the display layer 54, the PCB layer 56, and other components of the mobile device 12 that may or may not be on the PCB layer 56. For example, the housing may retain (e.g., hold, contain) antenna systems, front-end circuits, an intermediate-frequency circuit, and a processor discussed below. The housing is substantially rectangular, having two sets of parallel edges in the illustrated embodiment. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 56 may not be commensurate with the size and/or shape of either of the top or bottom covers or otherwise with a perimeter of the device. For example, the PCB layer 56 may have a cutout to accept a battery. Those of skill in the art will therefore understand that embodiments of the PCB layer 56 other than those illustrated may be implemented. The device 12 may have a metal frame with a non-metal (e.g., plastic) back cover, or may be metal backed, e.g., having a slotted metal-backed housing with a metal frame.

Figure 3:
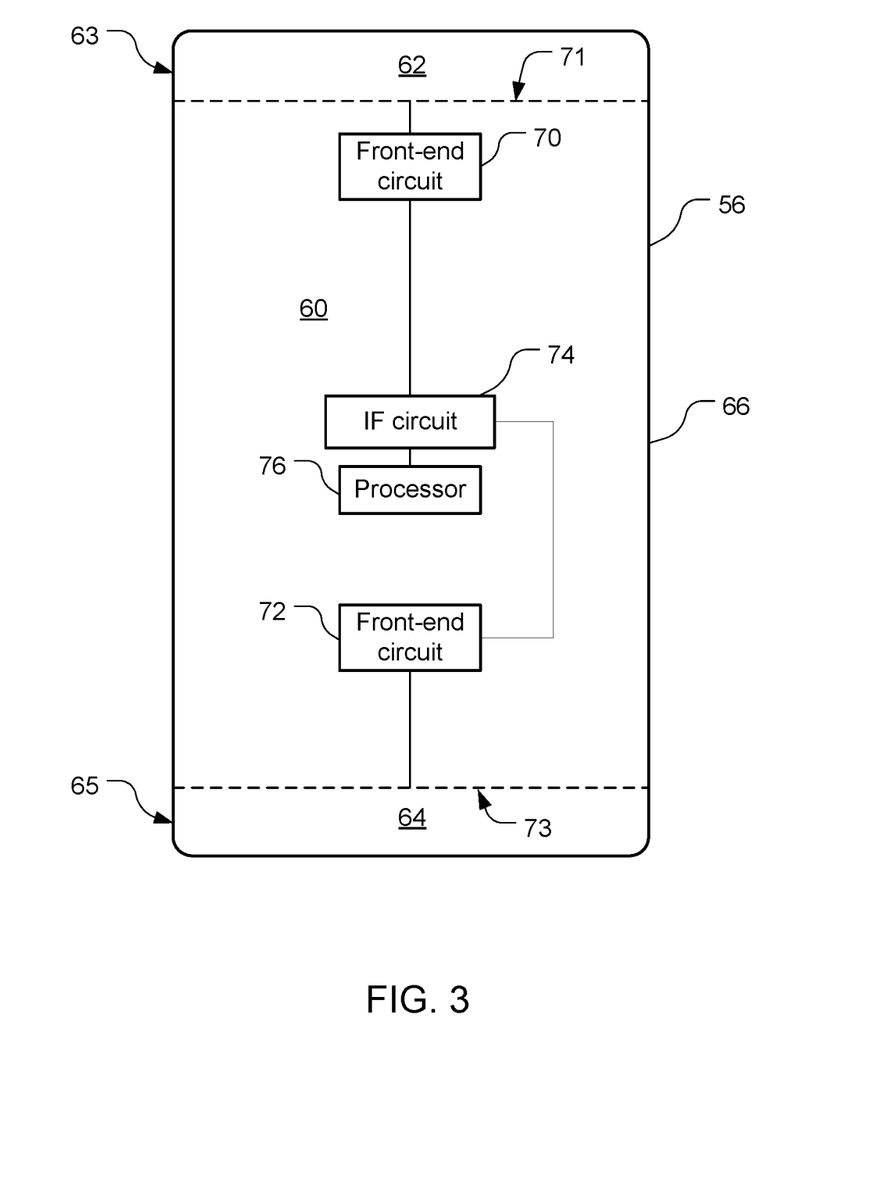
FIG. 3 is a top view of a printed circuit board layer, shown in FIG. 2, including antenna systems.

Referring also to FIG. 3, an example of the PCB layer 56 includes a main portion 60 and two antenna systems 62, 64. In the example shown, the antenna systems 62, 64 are disposed at opposite ends 63, 65 of the PCB layer 56, and thus, in this example, of the mobile device 12 (e.g., of the housing of the mobile device 12). The main portion 60 comprises a PCB 66 that includes front-end circuits 70, 72 (also called a radio frequency (RF) circuit), an intermediate-frequency (IF) circuit 74, and a processor 76. The front-end circuits 70, 72 are configured to provide signals to be radiated to the antenna systems 62, 64 and to receive and process signals that are received by, and provided to the front-end circuits 70, 72 from, the antenna systems 62, 64. The front-end circuits 70, 72 are configured to convert received IF signals from the IF circuit 74 to RF signals (amplifying with a power amplifier as appropriate), and provide the RF signals to the antenna systems 62, 64 for radiation. The front-end circuits 70, 72 are configured to convert RF signals received by the antenna systems 62, 64 to IF signals (e.g., using a low-noise amplifier and a mixer) and to send the IF signals to the IF circuit 74. The IF circuit 74 is configured to convert IF signals received from the front-end circuits 70, 72 to baseband signals and to provide the baseband signals to the processor 76. The IF circuit 74 is also configured to convert baseband signals provided by the processor 76 to IF signals, and to provide the IF signals to the front-end circuits 70, 72. The processor 76 is communicatively coupled to the IF circuit 74, which is communicatively coupled to the front-end circuits 70, 72, which are communicatively coupled to the antenna systems 62, 64, respectively. In some embodiments, transmission signals may be provided from the IF circuit 74 to the antenna system 62 and/or 64 by bypassing the front-end circuit 70 and/or 72, for example when further upconversion is not required by the front-end circuit 70 and/or 72. Signals may also be received from the antenna system 62 and/or 64 by bypassing the front-end circuit 70 and/or 72. In other embodiments, a transceiver separate from the IF circuit 74 is configured to provide transmission signals to and/or receive signals from the antenna system 62 and/or 64 without such signals passing through the front-end circuit 70 and/or 72.

In FIG. 3, dashed lines 71, 73 separating the antenna systems 62, 64 from the PCB 66 indicate functional separation of the antenna systems 62, 64 (and the components thereof) from other portions of the PCB layer 56. Portions of the antenna systems 62, 64 may be integral with the PCB 66, being formed as integral components of the PCB 66. One or more components of the antenna system 62 and/or the antenna system 64 may be formed integrally with the PCB 66, and one or more other components may be formed separate from the PCB 66 and mounted to the PCB 66, or otherwise made part of the PCB layer 56. Alternatively, each of the antenna systems 62, 64 may be formed separately from the PCB 66 and mounted to the PCB 66 and coupled to the front-end circuits 70, 72, respectively. The antenna systems 62, 64 may be configured similarly to each other or differently from each other. For example, one or more components of either of the antenna systems 62, 64, may be omitted. As an example, the antenna system 62 may include 4G and 5G radiators while the antenna system 64 may not include (may omit) a 5G radiator. In other examples, an entire one of the antenna systems 62, 64 may be omitted.

Also or alternatively, one or more portions of the antenna systems 62, 64 may form part of the housing of the device 12, e.g., part of the bottom cover 58 of the device 12. For example, a radiator (as further discussed below) may substitute for a portion of the bottom cover 58, e.g., a portion of a side of the bottom cover 58 and thus a portion of a side of the device 12. For example, a radiator of the antenna system 62 may substitute for all or a portion of a top side of the device 12, and portions of the left and right sides of the device 12, and/or a radiator of the antenna system 64 may substitute for all or a portion of a bottom side of the device 12, and portions of the left and right sides of the device 12.

A display 61 (see FIG. 2) of the display layer 54 may roughly cover the same area as the PCB 66 and serve as a system ground plane for at least portions of the antenna systems 62, 64, e.g., feed lines (and possibly other components of the device 12). The display 61 is disposed below the antenna system 62 and above the antenna system 64 (with "above" and "below" being relative to the mobile device 12, i.e., with a top of the mobile device 12 being above other components regardless of an orientation of the device 12 relative to the Earth).

Figure 4:
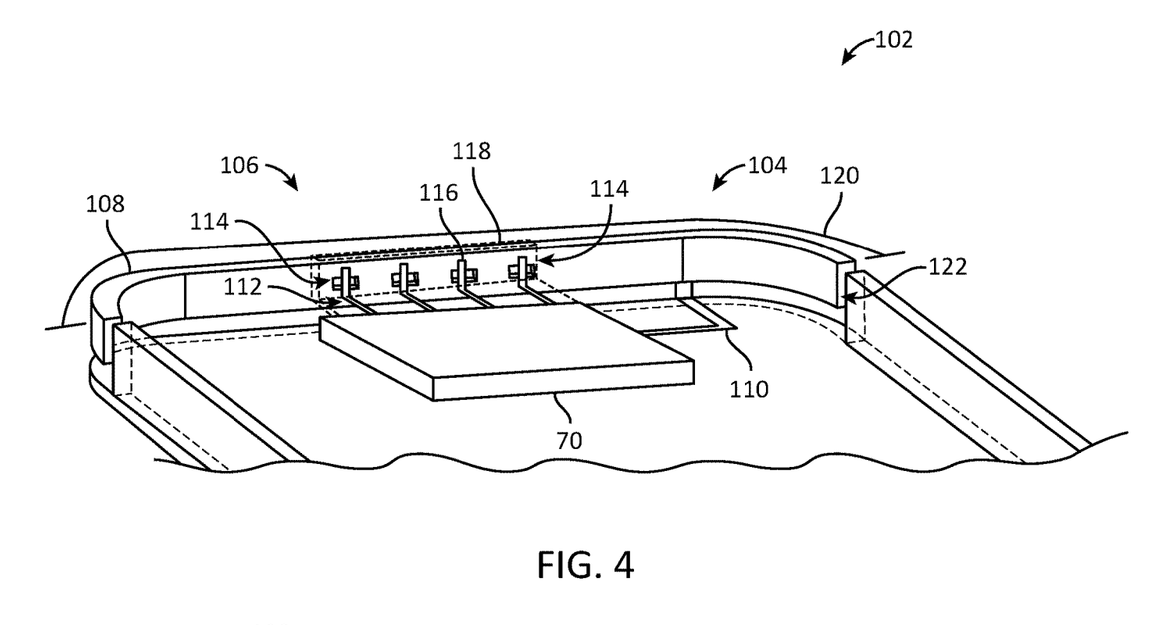
FIG. 4 is a perspective view of an example antenna system of one of the antenna systems shown in FIG. 3.
Figure 5:
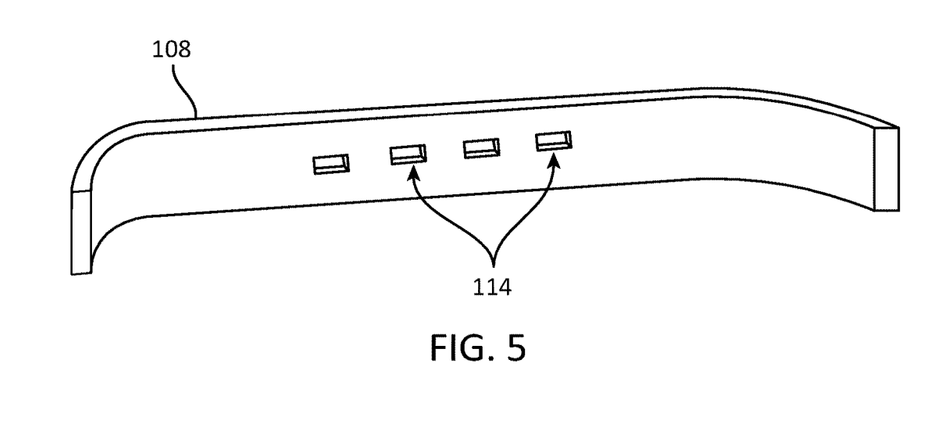
FIG. 5 is a perspective view of a low-frequency radiator and high-frequency radiators shown in FIG. 4.
Figure 6:
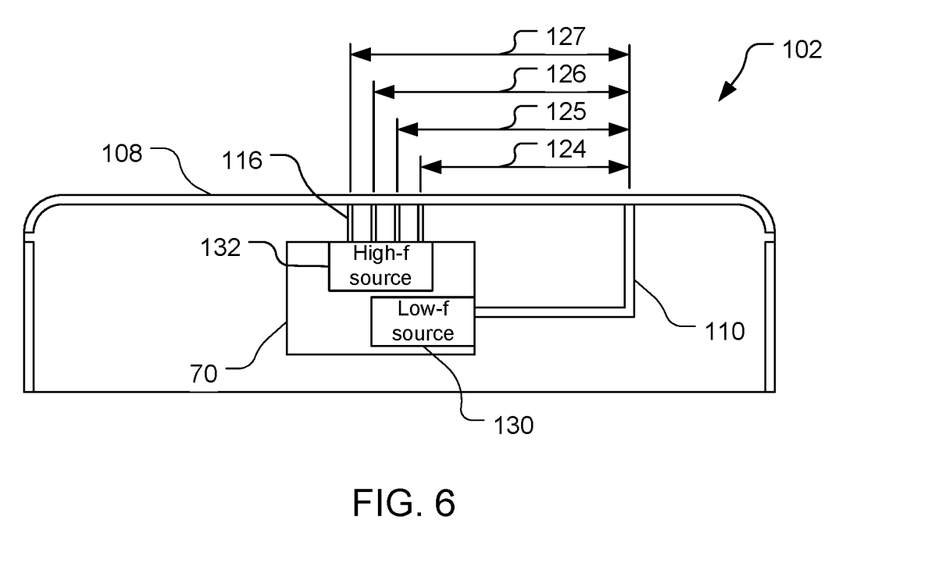
FIG. 6 is a simplified top view of the antenna system shown in FIG. 4.

Referring also to FIGS. 4-6, an antenna system 102, which is an example of the antenna system 62, e.g., for use in wireless communication, includes a lower-frequency antenna sub-system 104 and a higher-frequency antenna sub-system 106. Thus, the antenna system 102 is a multi-band (e.g., dual-band) antenna system configured to radiate high-frequency energy having a high frequency, e.g., millimeter-wave energy above 23 GHz (such as about 28 GHz (e.g., 28 GHz±1.5 GHz), or approximately 39 GHz, or in the 60 GHz range, or at 71 GHz or higher), and to radiate low-frequency energy having a low frequency, e.g., sub-6 GHz energy at a frequency below 6 GHz (i.e., a sub-6 GHz frequency), e.g., about 0.859 GHz (e.g., 0.859 GHz±0.035 GHz). These frequencies are examples, and the sub-system 82 may be configured to radiate other frequencies. In some embodiments, such frequencies in different bands may support different bands of a single system or radio access technology (e.g., a 5G system having a sub-6 GHz band and a millimeter-wave band), or different bands of a plurality of systems or radio access technologies (e.g., two or more of a 4G system, 5G system, WLAN system, and Bluetooth system, among other possible systems).

To radiate the different frequencies, the antenna system 102 may be configured with a single radiator that is configured to resonate at the different frequencies. The single radiator may be configured to provide different resonant structures to resonate at the different frequencies.

The lower-frequency antenna sub-system 104 includes a radiator 108 coupled to the front-end circuit 70 by a low-frequency feed 110 and configured to radiate the low-frequency energy. The low-frequency feed 110 is configured and disposed to electrically couple (e.g., conductively couple) the low-frequency energy to or from the radiator 108 to cause the radiator 108 to resonate and radiate the low-frequency energy. The radiator 108 is configured to radiate or receive the low-frequency energy. While the discussion focuses on radiation of energy by the antenna sub-systems 104, 106, the antenna sub-systems may also or alternatively receive energy of the respective frequencies.

The higher-frequency antenna sub-system 106 includes a portion of the radiator 108 coupled to the front-end circuit 70 by a high-frequency feed 112 and configured to radiate or receive the high-frequency energy. In this example, the portion of the radiator 108 included in the higher-frequency antenna sub-system 106 defines slots 114 (here four slots 114, more clearly visible in the perspective view of the radiator 108 shown in FIG. 5), and the high-frequency feed 112 includes four feed lines 116, with each of the feed lines 116 corresponding to a respective one of the slots 114. The high-frequency feed 112 (here, the feed lines 116) is configured and disposed to electrically couple the high-frequency energy to or from multiple respective locations of the radiator 108. Here, the feed lines 116 are part of a flexible printed circuit (FPC) 118 and each of the feed lines 116 is a microstrip line that extends over and perpendicular to a length of a corresponding one of the slots 114. As illustrated, the FPC 118 and feed lines 116 may be coupled to the front-end circuit 70 so as to extend out therefrom (e.g., approximately perpendicular to the PCB 66) and bend or curve away from the PCB 66 such that a portion of the FPC 118 and feed lines 116 are situated approximately perpendicular to the PCB 66 and/or parallel to the radiator 108. It can be seen in FIG. 4 that a portion of each of the microstrip lines is overlying a respective one of the slots 114 to parasitically couple a respective portion of the high-frequency energy to each of the slots 114. More high-frequency energy may be coupled to the radiator 108, here the slots 114, than is eventually radiated by the radiator 108 (here the slots 114). Each of the feed lines 110, 116 may include an appropriate impedance-matching circuit, which may be contained in the front-end circuit 70. The front-end circuit 70 may include tuning circuitry for the lower-frequency antenna sub-system 104 and/or the higher-frequency antenna sub-system 106.

The radiator 108 in conjunction with the low-frequency feed 110 comprises a monopole antenna, which in FIG. 4 is illustrated as a folded monopole antenna. The radiator 108 comprises an electrically-conductive material such as an elongated strip of conductive material such as metal. The radiator 108 has a length 120 that is multiple of about a half of a wavelength (e.g., 0.4λ to 0.6λ) at the sub-6 GHz frequency. Thus, the radiator 108 is resonant at the low frequency, e.g., a sub-6 GHz frequency, and radiates along a length of the radiator 108. A short may be connected to the radiator 108, e.g., proximate to an end 122, of the radiator 108 such that the radiator 108 in conjunction with the feed 110 and the short form an inverted-F antenna. Alternatively, a sub-6 radiator may be configured as a dipole instead of a monopole, or as another form of radiator such as a loop.

The radiator 108 is formed with (defines) the slots 114 such that the radiator 108 will radiate from the slots 114 at a desired frequency or at desired frequencies. The radiator 108 is configured to define the slots 114 such that the slots 114 have lengths of a multiple of a half of a wavelength at each desired radiation frequency. For example, the slots 114 may be about a half-wavelength (e.g., between 0.45λ, and 0.55λ) long at the high frequency, e.g., a millimeter-wave frequency such as 28 GHz, 39 GHz, 60 GHz, etc. These lengths are of the wavelength in a dielectric if a dielectric occupies the slots 114. For example, the slots 114 may be filled by a plastic of the bottom cover 58, e.g., to inhibit water from entering the device 12. The slots 114 may be about a half of a wavelength at one high-frequency (e.g., 28 GHz) and about a wavelength (e.g., between 0.95λ, and 1.05λ) or other multiple of a half wavelength at one or more other high frequencies (e.g., 60 GHz) that may, for example, be used to radiate and receive energy for communications in accordance with the 802.11ad/ay protocols. For example, the slots 114 may each be about 5 mm long (e.g., between 4.5 mm and 5.5 mm), with this length being about 1λ at 60 GHz and about 0.47λ, at 28 GHz. The slots 114 as shown have lengths that are substantially parallel (e.g., within 5° of being parallel) to a length of the radiator 108. Alternatively, slots may be provided that are substantially transverse (e.g., within 5° of perpendicular) to the length of the radiator, with the feed lines being transverse to the lengths of the slots.

Figure 7:
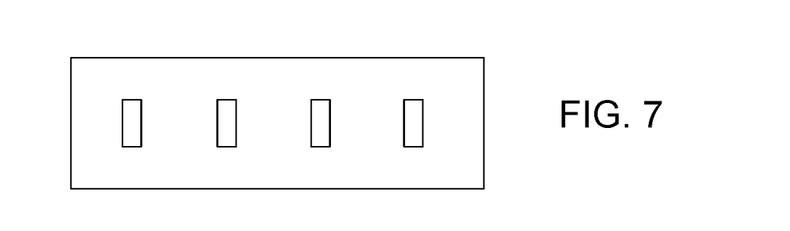
FIGS. 7-11 are examples of alternative slot radiator configurations.
Figure 8:
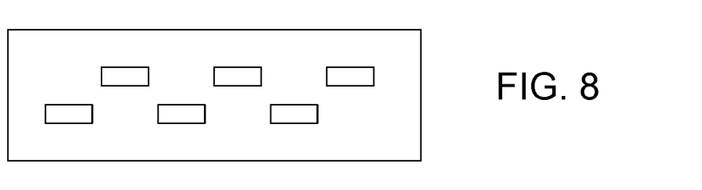
Figure 9:
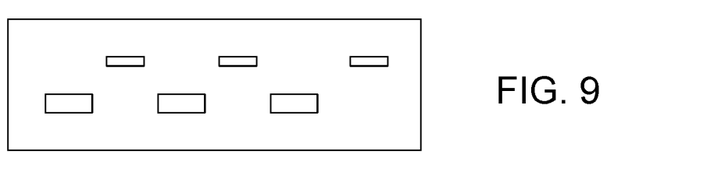
Figure 10:
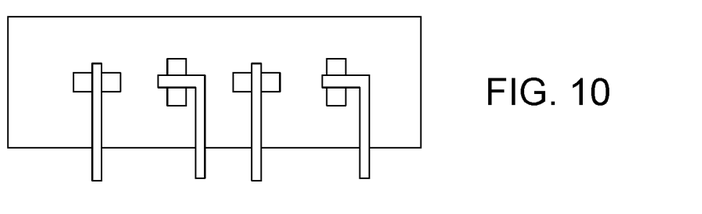
Figure 11:
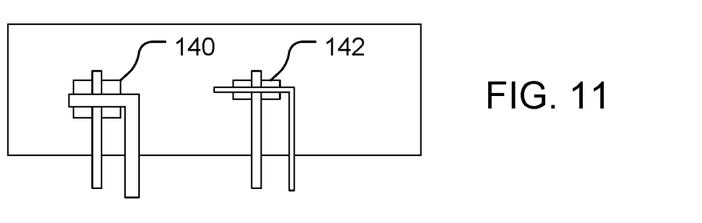

The configuration of the slots 114 shown in FIGS. 4 and 5 is an example only, and not limiting. For example, other quantities of (more or fewer) slots may be used. As another example, one or more slots may have their lengths substantially transverse to a length of a radiator defining the slots (e.g., see FIG. 7). As another example, while the slots 114 are shown linearly aligned, slots may be disposed in other arrangements relative to each other, e.g., a two-dimensional array of similarly-shaped and fed slots (e.g., see FIG. 8; feed lines not shown), or a two-dimensional array of differently-shaped and/or fed slots, for example with one row being fed at one frequency and another row fed with a different frequency (e.g., see FIG. 9; feed lines not shown). As another example, while the slots 114 are shown being excited with the same polarization, slots may be arranged and fed for different polarizations (e.g., one or more slots arranged and fed for vertical polarization and one or more slots arranged and fed for horizontal polarization (e.g., see FIG. 10)). As another example, one or more slots may be configured and fed for multi-polarization radiation, e.g., fed for dual-polarization radiation (e.g., a slot (e.g., a slot 140 in FIG. 11) may be square and fed for dual-polarization radiation of similar frequencies, or a slot (e.g., a slot 142 in FIG. 11) may be rectangular and fed with different frequencies in length and width to radiate different frequencies with different polarizations, etc.). Still other configurations of slots may be used, e.g., combinations of configurations discussed above.

The slots 114 and the feed lines 116 are disposed to provide for beam steering of the high-frequency energy while inhibiting interference of the low-frequency energy with the high-frequency energy. The slots 114 may have a center-to-center spacing of less than a wavelength to permit beam steering while inhibiting the production of grating lobes. For example, the center-to-center spacing of the slots 114 may be about half of a wavelength of the high-frequency energy in free space. To inhibit coupling of a harmonic of the low-frequency energy with radiation locations of the high-frequency energy (here with the slots 114), and thus interference by the harmonic of the low-frequency energy with the high-frequency energy, the slots 114 may be disposed at or near locations of low current magnitude of the high-frequency energy (i.e., cold spots of the high-frequency energy) relative to the low-frequency feed 110. For example, centers of the slots 114 may be disposed along the length of the radiator 108 at odd multiples of about a quarter of a wavelength (e.g., a quarter wavelength±10%) at the high frequency from a center of where the low-frequency feed 110 connects to the radiator 108. For example, distances 124, 125, 126, 127 (FIG. 6) from a center of where the low-frequency feed 110 connects to the radiator 108 may be n, n+2, n+4, n+6 quarter wavelengths, respectively, of the high frequency, with n being odd.

In the embodiment illustrated in FIG. 6, the front-end circuit 70 of the antenna system 102 includes a low-frequency source 130 and a high-frequency source 132. The low-frequency source 130 is coupled to the feed line 110 and configured to provide the low-frequency energy to the feed line 110 for the radiator 108. The high-frequency source 132 is coupled to the feed lines 116 and configured to provide the high-frequency energy to the feed lines 116 for the radiator 108, here to excite the slots 114. In some embodiments, the sources 130, 132 are configured to convert intermediate-frequency signals from the IF circuit 74 into sub-6 GHz and mm-wave-frequency signals, respectively, and provide those signals to the feeds 110, 116, respectively. If the IF circuit 74 is omitted (e.g., if it is not needed), then the sources 130, 132 may use signals (e.g., baseband signals) directly from the processor 76 to produce the sub-6 GHz and mm-wave-frequency signals, respectively. In other embodiments, the source 130 may couple signals to or from the feed 110 without significantly converting the frequency of the signals. In yet other embodiments, the feed 110 is coupled to circuitry, configured to send and/or receive low frequency signals, other than the front-end circuit 70.

Figure 12:
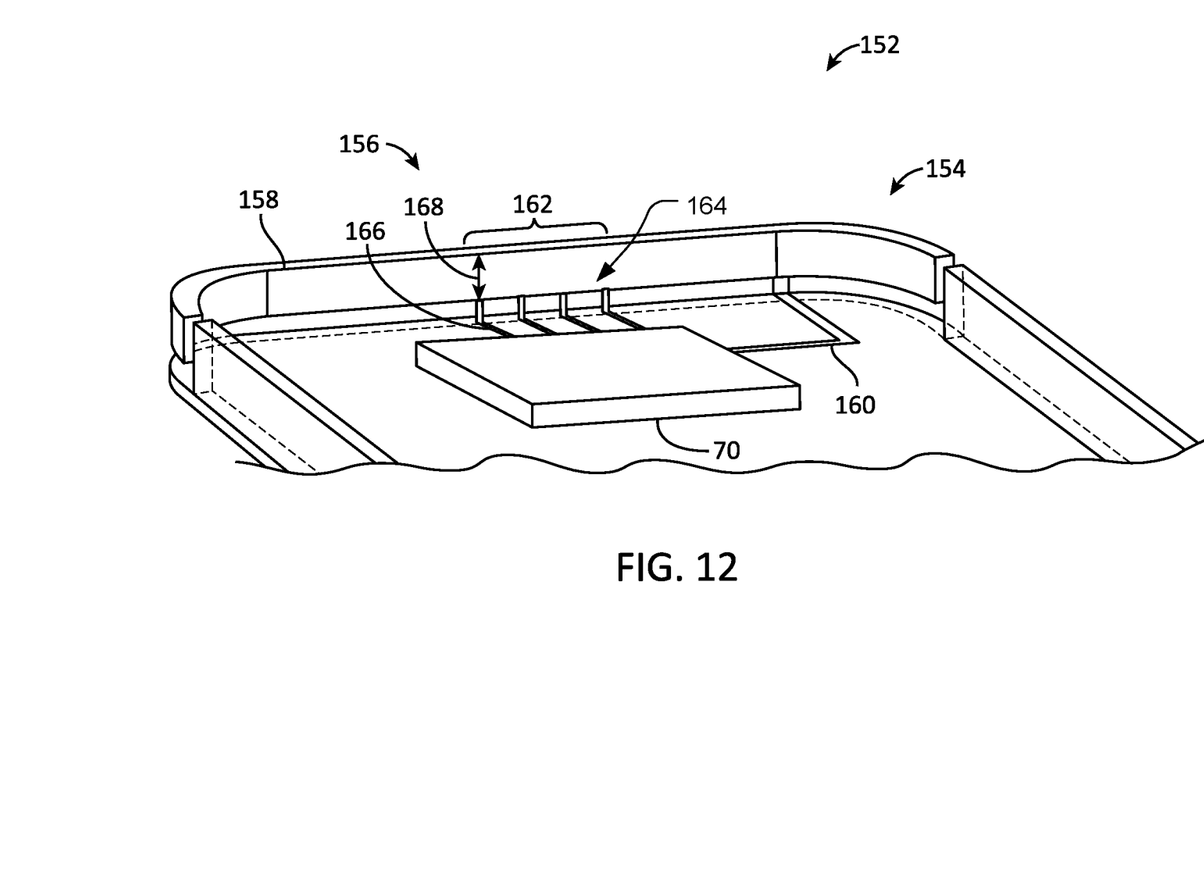
FIG. 12 is a perspective view of another example antenna system of one of the antenna systems shown in FIG. 3.

Referring to FIG. 12, with further reference to FIGS. 2-3, an antenna system 152, which is another example of the antenna system 62, e.g., for use in wireless communication, includes a lower-frequency antenna sub-system 154 and a higher-frequency antenna sub-system 156. Thus, the antenna system 152 is a multi-band antenna system configured to radiate high-frequency energy having a high frequency, e.g., millimeter-wave energy above 23 GHz, and to radiate low-frequency energy having a low frequency, e.g., sub-6 GHz energy at a frequency below 6 GHz. To radiate the different frequencies, the antenna system 102 may be configured with a single radiator that is configured to resonate at the different frequencies. The single radiator may be configured to resonate over different spans of the radiator at the different frequencies.

The lower-frequency antenna sub-system 154 includes a radiator 158 coupled to the front-end circuit 70 by a low-frequency feed 160 and configured to radiate the low-frequency energy. The low-frequency feed 160 is configured and disposed to electrically couple the low-frequency energy to the radiator 158 to cause the radiator 158 to resonate and radiate the low-frequency energy. The radiator 158 may be a monopole as shown, or may be an inverted-F monopole by adding a short, or may be a dipole, or may be another form of radiator such as a loop. Further, the radiator 158 may provide a portion of a housing of the device 12, e.g., in lieu of a portion of the bottom cover 58.

The higher-frequency antenna sub-system 156 includes a portion 162 of the radiator 158 coupled to the front-end circuit 70 by a high-frequency feed 164 and configured to radiate the high-frequency energy. In this example, the portion 162 of the radiator 158 included in the higher-frequency antenna sub-system 156 comprises sections of the radiator 158 corresponding to where feed lines 166 of the high-frequency feed 112 connect to the radiator 158. The high-frequency feed 112 (here, the feed lines 116) is configured and disposed to electrically (conductively) couple the high-frequency energy to multiple respective locations of the radiator 108. A width 168 of the radiator 158 at each of the locations where one of the feed lines 166 is physically attached to the radiator 158 is a multiple of about a half a wavelength (e.g., between m*0.5λ±10%, where m is an integer) at the high frequency. The high-frequency energy will thus be resonant over the width 168 and radiate from and along the width of the radiator 158. More high-frequency energy may be coupled to the radiator 158 by the feed lines 166 than is eventually radiated by the radiator 158. Each of the feed lines 160, 166 may include an appropriate impedance-matching circuit, which may be contained in the front-end circuit 70.

The feed lines 166 are connected to the radiator 158 to provide for beam steering of the high-frequency energy while inhibiting interference of the low-frequency energy with the high-frequency energy. The connections of the feed lines 166 to the radiator 158 may have center-to-center spacings of less than a wavelength to permit beam steering while inhibiting the production of grating lobes. For example, the center-to-center spacing of the connections of the feed lines 166 to the radiator 158 may be about half of a wavelength of the high-frequency energy in free space. As with the slots 114 of the antenna system 102, to inhibit coupling of a harmonic of the low-frequency energy with radiation locations of the high-frequency energy, and thus interference by the harmonic of the low-frequency energy with the high-frequency energy, the connections of the feed lines 166 to the radiator 158 may be disposed at or near locations of low current magnitude of the high-frequency energy (i.e., cold spots of the high-frequency energy) relative to the low-frequency feed 160. For example, centers of the feed lines 166 may be disposed along the length of the radiator 158 at odd multiples of about a quarter of a wavelength (e.g., a quarter wavelength±10%) at the high frequency from a center of where the low-frequency feed 160 connects to the radiator 158. For example, distances 124, 125, 126, 127 (FIG. 6) from a center of where the low-frequency feed 110 connects to the radiator 108 may be n, n+2, n+4, n+6 quarter wavelengths, respectively, of the high frequency, with n being odd.

Other antenna sub-system configurations may be used. For example, a slot high-frequency radiator (e.g., any of those shown in FIG. 4, 5, or 7-11) may be combined with the antenna sub-system 150 shown in FIG. 12, for example such that the feed lines 166 are coupled to the radiator 158 between slots. As another example, while antenna sub-system configurations have been described as being incorporated into an edge of a mobile device, antenna sub-systems in accordance with the disclosure are not limited to such locations. For example, antenna sub-systems in accordance with the disclosure may be incorporated into other locations in a mobile device (e.g., a back of a device), and/or may be used in other devices and/or systems.

Figure 13:
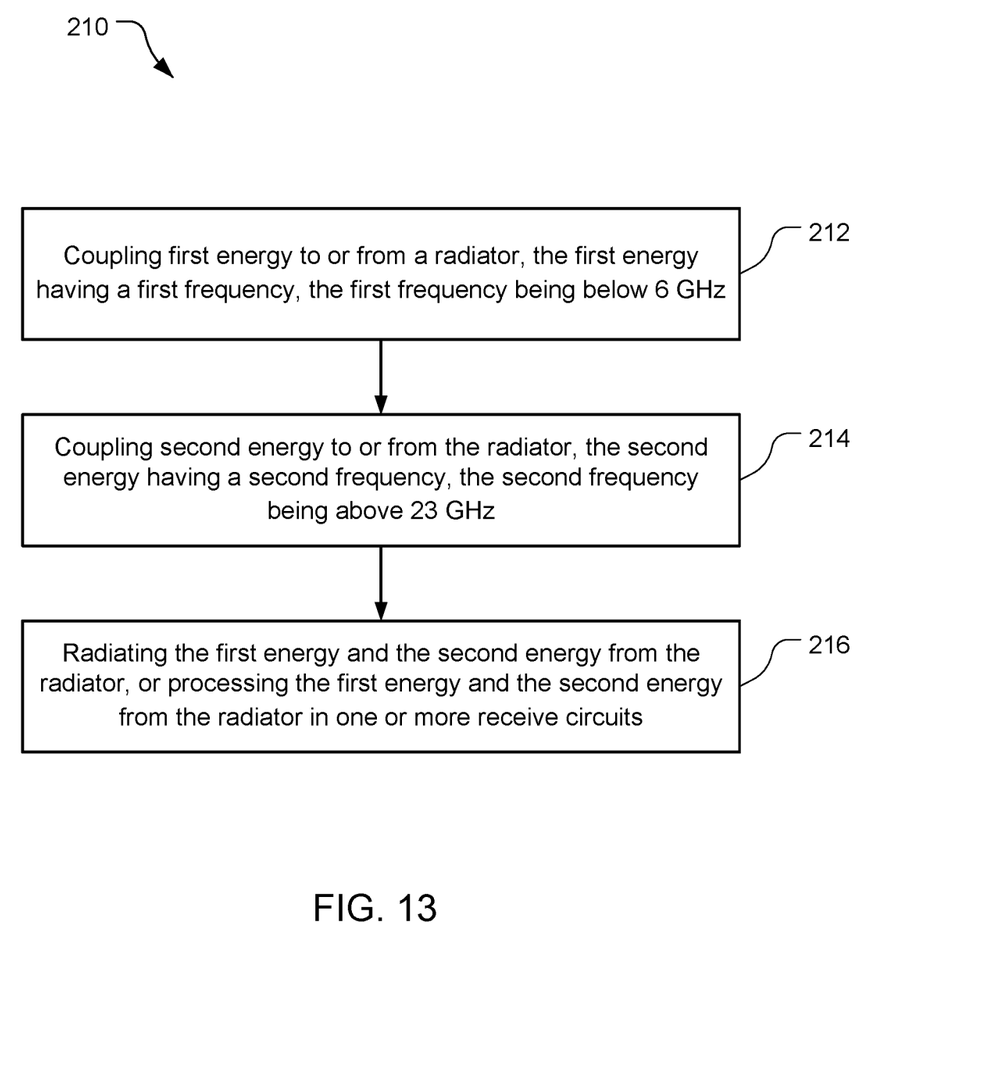
FIG. 13 is a block flow diagram of a method of radiating radio-frequency signals from a wireless mobile communication device.

Referring to FIG. 13, with further reference to FIGS. 1-6, a method 210 of transferring radio-frequency energy includes the stages shown. The method 210 is, however, an example only and not limiting. The method 210 may be altered, e.g., by having stages added, removed, rearranged, combined, performed concurrently, and/or having single stages split into multiple stages.

At stage 212, the method 210 includes coupling first energy to or from a radiator, the first energy having a first frequency, the first frequency being below 6 GHz. For example, the front-end circuit 70 may couple sub-6 GHz energy to and/or from the radiator 108 via the feed line 110 in the antenna system 102 or to and/or from the radiator 158 via the feed line 160 in the antenna system 152. The energy may be provided to the radiator 108 or the radiator 158 by the front-end circuit 70 based on IF signals received from the IF circuit 74, which are in turn based on signals from the processor 76. First energy provided to the radiator 108 or the radiator 158 may be radiated by the respective radiator. Also or alternatively, the energy may be received from the radiator 108 or the radiator 158 by the front-end circuit 70.

At stage 214, the method 210 includes coupling second energy to the radiator, the second energy having a second frequency, the second frequency being above 23 GHz. For example, the front-end circuit 70 may couple energy to and/or from the slots 114 via the feed lines 116 in the antenna system 102 or to and/or from the radiator 158 via the feed lines 166 in the antenna system 152. The locations of the slots 114 or the locations of the couplings of the feed lines 166 to the radiator 158 may each be a respective multiple of a quarter of a wavelength at the second frequency to help inhibit interference of the energy provided via the feed line 110, 160 with the second energy radiated and/or received by the slots 114 or the radiator 158 (e.g., the resonant width of the radiator 158). Second energy coupled to the slots 114 and/or the radiator 158 may be radiated by the slots 114 and/or the radiator 158.

At stage 216, the method 210 includes radiating the first energy and the second energy from the radiator, or processing the first energy and the second energy from the radiator in one or more receive circuits. For example, the radiator 108 may radiate energy provided via the feed line 110 and the slots 114 may radiate energy provided by the feed lines 116. Also or alternatively, the front-end circuit 70 (and/or the front-end circuit 72), and the IF circuit 74, and the processor 78 may process energy received from the radiator 108 via the feed line 110 and energy received from the slots 114 via the feed lines 116. For example, the circuits 70, 72, 74 and the processor 76 may downconvert signals, convert signals from analog to digital, decode the signals, and take other actions with the signals (e.g., store information from the signals, take action triggered by content of the signals, etc.).

The method 210 may include one or more other features. For example, the first energy may be coupled along a length of the radiator, e.g., the radiator 108 or the radiator 158. The second energy may be coupled to or from slots defined by the radiator at respective locations. The second energy may be coupled to or from the radiator over a width of the radiator, e.g., the radiator 158. Respective portions of the second energy may be coupled, e.g., by the feeds 166, at respective odd multiples of a quarter of a wavelength at the second frequency from a location where the first energy is coupled to the radiator, e.g., the radiator 158.

Other Considerations

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A wireless communication antenna system comprising:
   a sub-6 antenna including a radiator comprising an electrically conductive element, the electrically conductive element configured to radiate or receive first energy having a first frequency, the first frequency being below 6 GHz;
   a first feed configured and disposed to electrically couple the first energy to or from the radiator; and
   a second feed configured and disposed to electrically couple second energy to or from the radiator, the second energy having a second frequency, the second frequency being above 23 GHz;
   wherein the radiator is configured to radiate or receive the second energy, and
   wherein the radiator is configured to radiate the first energy along a length of the radiator and to radiate the second energy along a width of the radiator.

2. The antenna system of claim 1, wherein the second feed is configured to couple a respective portion of the second energy to each of a plurality of locations of the radiator.

3. The antenna system of claim 2, wherein the second feed is physically or parasitically coupled to the radiator at each of the plurality of locations.

4. The antenna system of claim 3, wherein the electrically conductive element comprises an elongated strip of conductive material having a width at each of the plurality of locations of a multiple of about a half of a wavelength at the second frequency.

5. The antenna system of claim 2, wherein the first feed is configured and disposed to couple the first energy to the radiator at a first location, wherein the plurality of locations is a plurality of second locations, and wherein each of the plurality of second locations is displaced from the first location by a respective odd multiple of about a quarter of a wavelength at the second frequency.

6. The antenna system of claim 1, wherein the radiator comprises a portion of a housing of a mobile wireless communication device.

7. The antenna system of claim 1, wherein the radiator has a length of a multiple of about a half of a wavelength at the first frequency and the width of the radiator is a multiple of about a half of a wavelength at the second frequency.

8. The antenna system of claim 7, wherein the second feed is configured and disposed to electrically couple the second energy to or from the radiator at a plurality of locations displaced from each other along the length of the radiator.

9. The antenna system of claim 8, wherein the width of the radiator at each of the plurality of locations is a multiple of about a half of the wavelength at the second frequency.

10. The antenna system of claim 8, wherein the first feed is configured and disposed to couple the first energy to or from the radiator at a first location, wherein the plurality of locations is a plurality of second locations, and wherein each of the plurality of second locations is displaced from the first location by a respective odd multiple of about a quarter of the wavelength at the second frequency.

11. The antenna system of claim 1, further comprising:
a first source configured to provide the first energy, the first feed being coupled to the first source and to the radiator; and
a second source coupled to the second feed and configured to provide the second energy to the second feed.

12. The antenna system of claim 1, wherein the radiator is a monopole radiator at the first frequency.

13. The antenna system of claim 1, wherein the radiator is a dipole radiator at the first frequency.

14. The antenna system of claim 1, wherein the radiator is a loop radiator.

15. A wireless communication antenna system, comprising:
a sub-6 antenna including a radiator comprising an electrically conductive element, the electrically conductive element configured to radiate or receive first energy having a first frequency, the first frequency being below 6 GHz;
a first feed configured and disposed to electrically couple the first energy to or from the radiator; and
a second feed configured and disposed to electrically couple second energy to or from the radiator, the second energy having a second frequency, the second frequency being above 23 GHz;
wherein the radiator is configured to radiate or receive the second energy, and
wherein the radiator is a monopole radiator defining one or more slots to radiate the second energy, and wherein the second feed is configured and disposed to electrically couple the second energy to the radiator at one or more locations corresponding to the one or more slots such that the second energy will be coupled to the radiator and radiate from the radiator at the one or more slots.

16. The antenna system of claim 15, wherein the radiator defines a plurality of slots, with each of the plurality of slots being disposed at a respective one of a plurality of locations.

17. The antenna system of claim 16, wherein the second feed comprises a plurality of microstrip lines, with each of the plurality of microstrip lines overlying a respective one of the plurality of slots.

18. The antenna system of claim 15, wherein at least one of the one or more slots has a length substantially parallel to a length of the radiator.

19. The antenna system of claim 18, wherein the second feed comprises one or more microstrip lines, with each of the one or more microstrip lines overlying a respective one of the one or more slots.

20. The antenna system of claim 15, wherein at least one of the one or more slots has a length substantially transverse to a length of the radiator.

21. The antenna system of claim 15, wherein the first feed is configured and disposed to couple the first energy to the radiator at a first location, wherein the one or more slots is a plurality of slots and the one or more locations is a plurality of second locations, and wherein each of the plurality of second locations is displaced from the first location by a respective odd multiple of about a quarter of a wavelength at the second frequency.

22. A radio-frequency energy transfer method comprising:
coupling first energy to or from a radiator, the first energy having a first frequency, the first frequency being below 6 GHz;
coupling second energy to or from the radiator, the second energy having a second frequency, the second frequency being above 23 GHz; and
radiating the first energy and the second energy from the radiator, or processing the first energy and the second energy from the radiator in one or more receive circuits,
wherein coupling the first energy to or from the radiator comprises coupling the first energy to or from the radiator along a length of the radiator, and
wherein coupling the second energy to or from the radiator comprises
coupling the second energy to or from one or more slots each defined by the radiator at a respective one of one or more locations along the radiator, or
coupling the second energy to or from the radiator over a width of the radiator.

23. The method of claim 22, wherein coupling the second energy to or from the radiator comprises coupling the second energy to or from a plurality of slots each defined by the radiator at a respective one of a plurality of locations along the radiator.

24. The method of claim 22, wherein coupling the second energy to or from the radiator comprises coupling the second energy to or from the radiator over a width of the radiator at each of a plurality of locations along the radiator.

25. The method of claim 24, wherein coupling the first energy comprises coupling the first energy at a first location along the length of the radiator, and coupling the second energy to or from the radiator comprises coupling respective portions of the second energy at respective odd multiples of a quarter of a wavelength at the second frequency from the first location.

* * * * *